April 1, 1952   G. R. ERICSON   2,591,056
FILTER
Filed June 16, 1947

INVENTOR

*George R. Ericson*

Patented Apr. 1, 1952

2,591,056

UNITED STATES PATENT OFFICE 2,591,056

FILTER

George R. Ericson, Kirkwood, Mo., assignor to Carter Carburetor Corporation, St. Louis, Mo., a corporation of Delaware Application June 16, 1947, Serial No. 754,882

2 Claims. (Cl. 210—181)

This invention relates to filtering means suitable for embodiment in oil filters for use in connection with automotive internal combustion engines, and has particular reference to a filter element of improved and simplified construction, wherein the element is of wafer or disc form to permit assembly stacking of any number thereof to afford a filter unit of desired capacity.

An object of the invention is to provide a disc-form filter element of an improved, relatively simple and inexpensive construction, which is capable of maintaining its general structural shape and filtering capacity over a long period of use.

Another object is to provide a filter element of the character indicated, having a fine porosity capable of filtering out the finest solids and carbon particles from lubricating oil, whereby to afford filtered oil of visibly clean and clear condition.

Another object of the invention is to provide a filter element of improved construction, having resilient filtering surface portions capable of flexure to a degree sufficient for causing rupture and break-up of slime deposits on the element, until the accumulation of filtered-out solids becomes such as to render the filter unfit for further use.

Further objects and advantages of the invention will appear from the following description of a presently preferred embodiment thereof, as illustrated by the accompanying drawing, wherein.

Figure 1:
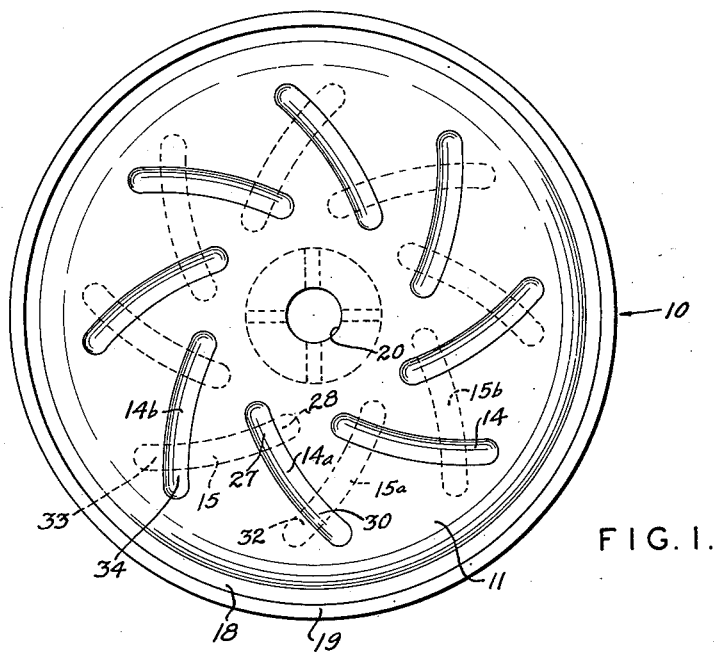
Fig. 1 is a plan view of a filter element constructed in accordance with the present invention.

By present preference the wafer-like filter element, indicated generally at 10, is of disc or circular form, although it will be appreciated from the following description, that the invention is susceptible of ready application to wafer elements of other than circular periphery, as one of square, rectangular or other perimetral extent.

Referring to the drawing, the filter element 10 comprises sheets of filter paper 11 and 12 separated by a series of ribs 14 on sheet 11 engaging similar ribs 15 on sheet 12, and by a separating or spacing member 16 in the central region of the sheets. The outer circular margins 18 of the sheets are in surface abutment as shown, and preferably are secured together in any suitable manner, as by the ferrules 19 or by cementing the edges together. Moreover, the sheets have central circular apertures 20 which are in axial registry in element assembly, but spaced apart by the washer-like member 16, the latter being mounted between the inner sheet margins 22 and having its central opening 23 coaxial with the sheet apertures 20. Member 16, which may be of metal or other suitable rigid material, is provided with radial passages 24 serving to connect the interior chamber 26 of the filter element, with the washer opening 23, as for a purpose to appear.

Figure 3:
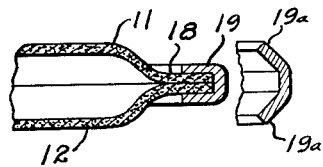
Fig. 3 is an enlarged sectional view of the ferrules and the method of forming the same.

Ferrules 19 as shown in Fig. 3 are formed from strip metal rolled to a channel form before being applied to the margin 18 of the wafer-like filter elements 10. When ferrule 19 is applied to the element 10, the edges 19a are rolled to securely bind the margin 18 against fluid entering between the filter paper sheets 11 and 12.

The ribs 14 are integral parts of filter sheet 11, being provided by a plurality of projections or sheet indentations each of an elongate, somewhat arcuate character, arranged in regular order about the sheet substantially as shown in Fig. 1. Each rib indentation as appears, is directed at an angle to a radius of the sheet which intersects the longitudinal center of the rib-forming indentation. Ribs 15 integral with filter sheet 12, are of like character and arrangement in regular order about the sheet, but in the relatively inverted, rib-to-rib assembly of the sheets 11 and 12, the ribs 15 are directed oppositely to the ribs 14, as this appears from the dotted line showing of ribs 15 in Fig. 1. Consequently, and by reason of the length and relative spacing of the ribs in each sheet, in the assembled filter element with the sheets properly angularly related, the ribs cross in the manner shown. The crossed relationship is such that the inner end portion 27 of rib 14a engages in crossed relation the inner end portion 28 of rib 15, while the outer end portion 30 of rib 14a is related similarly to the outer end portion 32 of a next adjacent rib 15a and the outer end portion 33 of rib 15 similarly engages the outer end portion 34 of rib 14b. This arrangement obtains uniformly about the element, and is fully effective to maintain the desired separation of the filter sheets.

The ribs 14 and 15 while serving to space the filter sheets, serve additionally and importantly herein as reinforcing elements, strengthening each filter sheet against lateral bending or sagging in assembly. Moreover, by limiting the sheet spacing engagement of the rigs to relatively small areas in each, a major portion of each rib is thereby fully exposed to function equally with the planar areas of the filter sheets, in the filtering of oil therethrough.

The sheets 11 and 12 having the form above described, are constructed in the following manner: Rag fibre filter paper of suitable fine porosity, is cut into circular elements of proper size for the purpose. Each of the resulting circular sheets then is dampened to a predetermined degree sufficient for heat-molding thereof, following which the dampened sheet is molded with the application of heat, to provide the dish-shaped character of filter sheet element before described, having a peripheral flange-like margin and rib-forming indentations.

The molded filter paper then is treated preferably by soaking in a solution of cellulose brushing lacquer and thinner, the solution being comprised of a suitable volume of lacquer, thin enough to be of proper consistency for ordinary brush application, and from ten to twenty times its volume of lacquer thinner. The thin lacquer treatment does not result in any coating which is visible to the naked eye, but is entirely effective for its purpose, which is to block the normal hydroscopic action of the paper but still leave the paper pores unobstructed upon drying. By so treating the paper, the fibres thereof become impregnated, but not noticeably coated, with the waterproof lacquer, thus rendering the filter paper impervious to moisture which may be contained in the oil. Moreover, the lacquer serves to cement the fibres in a manner to increase the tensile strength and toughness thereof. The finished paper has adequate rigidity to be yieldably form sustaining under the relatively low oil pressures of an automotive lubrication system. This process is covered in my Patent No. 1,944,550.

Figure 2:
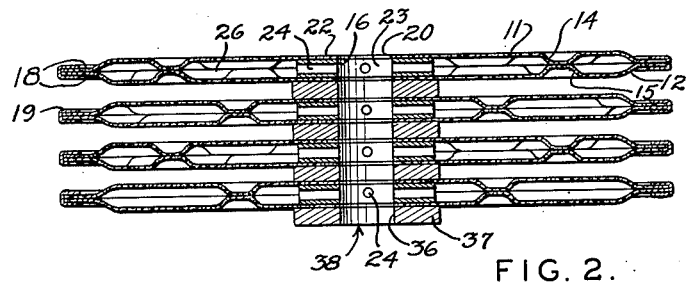
Fig. 2 is a sectional elevation of a number of filter elements in stacked relation, the view indicating the interior form of the presently improved elements.

Fig. 2 illustrates a number of filter elements each constructed according to the present invention, in stacked relation such that the central apertures 20 of the sheets 11 and 12, the central openings 23 of the spacer washers 16, and the apertures 36 of members 37 serving to space apart the filter elements, are all in axial registry. The result is an axial passage 38 through which filtered oil passes to discharge, it being understood that oil to be filtered is conveyed to the outer surfaces of the filter elements for filtering passage through the filtering sheets to the interior chamber 26 of each element, the filtered oil then passing through the passages 24 in the spacer washers 16 to discharge passage 38.

Figure 4:
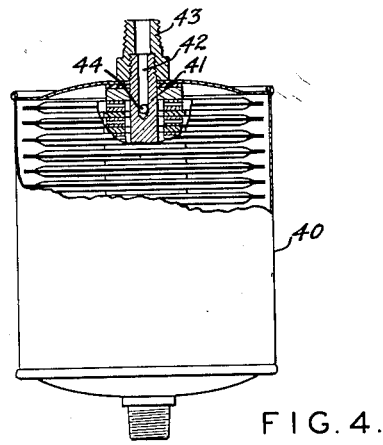
Fig. 4 is a reduced section illustrating a complete filter incorporating a plurality of the filtering elements.

Fig. 4 shows a unit of stacked filter elements such as indicated in Fig. 2, mounted in a filter casing 40 upon a bolt 41 having a hollow upper part 42 communicating with outlet fitting 43 and, through holes 44, with the registering central apertures in the filter elements.

In operation, the filter papers of each element normally will undergo some degree of depression in the areas thereof between the points of spacing rib engagement, as a result of the oil pressure on the filter surfaces produced by the pressure delivery of oil to the filter. Such depression is here permitted by the flexibility and resiliency of the paper fibres afforded by the lacquer treatment thereof, and in consequence of the presently improved manner of separating the filter sheets. When the engine is stopped, oil pressure on the surfaces of the filter elements is relieved, and thereafter the inwardly displaced areas of the filter papers reassume their original positions. Consequently, in repeated starting and stopping of the engine, the filter papers will be correspondingly flexed, thereby resulting in interior kneading of the fibrous paper structure, and coincidentally therewith, a kneading and break-up of slime beds forming on the filter surfaces. This action therefore, serves to prolong the original fine porosity of the filter papers and the filtering effectiveness of the filter elements.

A filter element constructed in accordance with the present invention, is desirably economical of manufacture, and presents a comparatively simple structure wherein the molded and treated filter papers are characterized by structural stability against sagging or collapse in filtering use, and pliability and resiliency of the fibre structure thereof as for the purpose described.

It will be understood that the present invention is readily susceptible of many modifications, and all such modifications as come within the scope of the appended claims, are contemplated.

I claim:

1. A filter element for fluid filters, said element being formed of superimposed spaced walls bonded together at their outer marginal edge portions, said walls being formed with registering central openings and intermediate planar portions, each of said spaced walls being formed at their planar portions with inwardly facing ribs angularly directed with respect to the radius of the structure and of such length and so relatively spaced that they will each overlie and contact at intersecting inner and outer points, respectively, the adjacent ribs formed in the opposite wall, whereby the walls will be relatively spaced and supported in two spheres about the center of the structure.

2. A filter element for fluid filters, comprising sheet members of form-sustaining fibrous filter material each formed to provide a substantially planar body terminating peripherally in a flange-margin laterally offset from the body, and a plurality of spaced, symmetrically arranged, elongate ribs outstanding on the body and each directed at an angle with respect to a radius of the body intersecting the longitudinal center of the rib, said members being relatively inverted one upon the other in assembly with said ribs so relatively angularly directed on the members that in the assembly of the members, each member is in bridging engagement with an adjacent pair of ribs of the other member, and means for securing said flange-margins together.

GEORGE R. ERICSON.

REFERENCES CITED

The following references are of record in the file of this patent:

UNITED STATES PATENTS

| Number | Name | Date |
|---|---|---|
| 509,441 | Medina-Santurio | Nov. 28, 1893 |
| 605,883 | Kuersten | June 21, 1898 |
| 1,944,550 | Ericson | Jan. 23, 1934 |
| 2,017,201 | Bossart et al. | Oct. 15, 1935 |
| 2,165,931 | Levy | July 11, 1939 |
| 2,345,014 | Stamsvik | Mar. 28, 1944 |
| 2,372,865 | Taylor | Apr. 3, 1945 |
| 2,374,755 | Kisch | May 1, 1945 |
| 2,430,078 | Reinsch et al. | Nov. 4, 1947 |
| 2,435,115 | Alsop | Jan. 27, 1948 |

FOREIGN PATENTS

| Number | Country | Date |
|---|---|---|
| 780,398 | France | Jan. 29, 1935 |